US007730332B1

(12) United States Patent
Templeton

(10) Patent No.: US 7,730,332 B1
(45) Date of Patent: Jun. 1, 2010

(54) METHOD AND APPARATUS FOR IMPROVED DC POWER DELIVER, MANAGEMENT AND CONFIGURATION

(75) Inventor: James W. Templeton, Austin, TX (US)

(73) Assignee: Zilker Labs, Inc., Austin, TX (US)

( * ) Notice: Subject to any disclaimer, the term of this patent is extended or adjusted under 35 U.S.C. 154(b) by 312 days.

(21) Appl. No.: 11/405,293

(22) Filed: Apr. 17, 2006

Related U.S. Application Data

(63) Continuation of application No. 10/820,976, filed on Apr. 8, 2004, now Pat. No. 7,506,179.

(60) Provisional application No. 60/462,414, filed on Apr. 11, 2003.

(51) Int. Cl.
*G06F 1/00* (2006.01)
(52) U.S. Cl. ...................................................... 713/300
(58) Field of Classification Search .......... 713/300–340
See application file for complete search history.

(56) References Cited

U.S. PATENT DOCUMENTS

| 5,117,430 A | 5/1992 | Berglund |
| 5,646,509 A | 7/1997 | Berglund et al. |
| 5,675,480 A | 10/1997 | Stanford |
| 5,935,252 A | 8/1999 | Berglund et al. |
| 6,003,139 A | 12/1999 | McKenzie |

(Continued)

FOREIGN PATENT DOCUMENTS

WO   WO 02/31943 A2   4/2002

OTHER PUBLICATIONS

V. C. H. Nicholas, C. T. Lau, and B. S. Lee; "A Power LAN for Telecommunication Power Supply Equipment"; IEEE Conference on Computer, Communication, Control and Power Engineering (TENCON, Region 10); Oct. 1993; pp. 24-27; vol. 3; Beijing.

(Continued)

*Primary Examiner*—Thomas Lee
*Assistant Examiner*—Mohammed H Rehman
(74) *Attorney, Agent, or Firm*—Meyertons Hood Kivlin Kowert & Goetzel, P.C.; Jeffrey C. Hood

(57) ABSTRACT

A new system-level approach to managing the delivery of DC voltage and current. Several system level functions may be enabled without requiring separate ICs to perform those functions. Supervisory functions for a voltage converter may be performed by a central control module or chip that may be coupled to point-of-load voltage converters comprised in digital power management devices (DPMD) through a serial digital bus. The DPMDs may also use the high-speed serial digital bus to provide real-time feedback information to the central control module or chip. Single DPMDs may be combined together in a current sharing configuration in a "plug-and-play" fashion, where the control logic in each DPMD is capable of automatically establishing control loops required a multi-phase supply. Feedback necessary for establishing control may be transmitted across the digital bus coupling the devices. The supervisory functions may be included in each DPMD, which may communicate with each other over a serial digital bus, where the DPMDs singly or together may operate to perform control of their respective POLs, enabling configurations that do not require a central control module.

30 Claims, 5 Drawing Sheets

U.S. PATENT DOCUMENTS

| | | | |
|---|---|---|---|
| 6,079,026 | A | 6/2000 | Berglund et al. |
| 6,199,130 | B1 | 3/2001 | Berglund et al. |
| 6,262,900 | B1 | 7/2001 | Suntio |
| 6,396,167 | B1 | 5/2002 | Simburger et al. |
| 6,396,169 | B1 | 5/2002 | Voegeli et al. |
| 6,421,259 | B1 | 7/2002 | Brooks et al. |
| 6,470,382 | B1 | 10/2002 | Wang et al. |
| 7,177,970 | B2 | 4/2003 | Kondo et al. |
| 6,563,294 | B2 | 5/2003 | Duffy et al. |
| 6,754,720 | B1 | 6/2004 | Packer |
| 6,788,035 | B2 | 9/2004 | Bassett et al. |
| 6,915,440 | B2 | 7/2005 | Berglund et al. |
| 6,930,893 | B2 | 8/2005 | Vinciarelli |
| 6,936,999 | B2 | 8/2005 | Chapuis |
| 6,949,916 | B2 | 9/2005 | Chapuis |
| 6,965,502 | B2 | 11/2005 | Duffy et al. |
| 7,000,125 | B2 | 2/2006 | Chapuis et al. |
| 7,049,798 | B2 * | 5/2006 | Chapuis et al. ............. 323/282 |
| 7,080,265 | B2 | 7/2006 | Thaker et al. |
| 7,082,488 | B2 | 7/2006 | Larson et al. |
| 7,103,697 | B2 * | 9/2006 | Scordalakes ................ 710/302 |
| 7,206,944 | B2 | 4/2007 | Odaohhara et al. |
| 7,373,527 | B2 | 5/2008 | Chapuis |
| 2003/0070020 | A1 | 4/2003 | Kondo et al. |
| 2003/0142513 | A1 | 7/2003 | Vinciarelli |
| 2004/0093533 | A1 | 5/2004 | Chapuis et al. |
| 2004/0123164 | A1 | 6/2004 | Chapuis et al. |
| 2004/0123167 | A1 | 6/2004 | Chapuis |
| 2004/0135560 | A1 | 7/2004 | Kernahan et al. |
| 2004/0255070 | A1 | 12/2004 | Larson et al. |
| 2006/0172783 | A1 | 8/2006 | Leung et al. |

OTHER PUBLICATIONS

Jerry G. Williford and James T. Dubose; "30 kVA LF/VLF Power Amplifier Module"; IEEE Military Communications Conference (MILCOM '95); Nov. 1995; pp. 748-751, vol. 2.

R. Sebastian, M. Castro, E. Sancristobal, F. Yeves, J. Peire, and J. Quesada; "Approaching hybrid wind-diesel systems and Controller Area Network"; IEEE 28th Annual Conference of the Industrial Electronics Society; Nov. 2002; pp. 2300-2305, vol. 3.

James P. Earle; "IPMI/IPMB Satellite Controller for Power Supply Applications" (Preliminary Specification);C&D Technologies, Inc.; http://www.cd4power.com/data/apnotes/acan-02.pdf; 92 pages.

James P. Earle; "IPMI/IMPB Satellite Controller Test Procedure" (Application Guide); C&D Technologies, Inc.; www.cdpowerelectronics.net/products/appnotes/acan04.pdf; 12 pages.

"How to Design Battery Charger Applications that Require External Microcontrollers and Related System-Level Issues"; Dallas Semiconductor; www.maxim-ic.com/appnotes.cfm/appnote_number/680; Mar. 15, 2000.; 20 pages.

"APC-3000-R Front End AC-DC Power Shelf"; Advanced Power Conversion PLC (Data Sheet); Nov. 2002; 6 pages.

"Providing a DSP Power Solution from 5-V or 3.3-V Only System"; Texas Instruments; http://focus.ti.com/lit/an/slva069/slva069.pdf; May 1999; 12 pages.

"HDX-600P Hot Swap—600 Watts—1U High"; Switching Power, Inc.; www.switchpwr.com/hdx-600p.pdf; 2 pages.

"HDSX-600P: I²C Serial Bus Interface (for IPMI implementation):"; Switching Power, Inc.; www.switchpwr.com/I2C.pdf; 3 pages.

John M. Hawkins; "Characteristics of automated power system monitoring and management platforms"; Twenty-second International Telecommunications Energy Conference (INTELEC); Sep. 2000; pp. 46-50.

A. Jossen, V. Spath, H. Doring & J. Garche; "Battery Management Systems (BMS) for Increasing Battery Life Time"; The Third International Conference on Telecommunications Energy Special, (TELESCON); May 2000; pp. 81-88; Dresden, Germany.

Tom Lock; "Digitally Controlled Power Systems: How Much Intelligence Is Needed and Where It Should Be"; IEEE; 1998; pp. 345-348.

"SPI—APPNOTES: Alarm & Monitoring Signals"; Switching Power Inc.; 2 pages; www.switchpwr.com/alarm_signals.pdf.

"TDA8020HL Dual Smart Card Interface—Objective Specification v4.2—Data Sheet"; Feb. 24, 2001; 22 pages; Philips Semiconductors.

Chrisotphe Chausset; "Application Note—TDA8020HL/C2 Dual Smart Card Interface"; May 20, 2003; 28 pages; Philips Semiconductors.

"Intelligent charge switches for charging circuit applications"; Jul. 2002; 2 pages; Philips Semiconductors; The Netherlands.

"PCF50604 Power Management Unit—2.5G/3G controller for power supply and battery management"; Jul. 2001; 4 pages; Philips Semiconductors; The Netherlands.

John Perzow; "Point-of-load regulation adds flexibility to set-top-box design"; Jun. 27, 2002; pp. 73-80; vol. 47, Part 14; www.ednmag.com.

H. Taylor and L.W. Hruska; "Standard Smart Batteries for Consumer Applications" Proceedings of the Tenth Annual Battery Conference on Applications and Advances; Jan 1995; p. 183; Long Beach, CA, U.S.A.

"3-V to 6-V Input, 6-A Output Tracking Synchronous Buck PWM Switcher with Integrated FETs (SWIFT™) for Sequencing"; Oct. 2002-Apr. 2005; 21 pages; Texas Instruments Incorporated; http://focus.ti.com/lit/ds/symlink/tps54680.pdf.

"Programmable Four-Channel Step-Down DC/DC Converter"; Texas Instruments Incorporated; 2005; 16 pages; http://focus.ti.com/lit/ds/symlink/tps54900.pdf.

"LNBH21—LNB Supply and Control IC with Step-up Converter and I²C Interface" (Datasheet); Apr. 2004; 20 pages; STMicroelectronics; www.st.com/stonline/products/literature/ds/9890.pdf.

"Smart Battery System Specifications—System Management Bus Specification"; Dec. 11, 1998; 39 pages; SBS Implementers Forum.

"Advanced Configuration and Power Interface Specification"; Feb. 2, 1999; 397 pages; Intel Microsoft Toshiba.

"The I²C-Bus Specification—Version 2.1"; Jan. 2000; 46 pages; Philips Semiconductors.

"User's Guide Agilent Technologies Series 661xxA MPS Power Modules & Model 6001A MPS Keyboard"; Apr. 2000; 55 pages; Agilent Technologies; Malaysia.

Programming Guide Agilent Technologies Series 661xxA MPS Power Modules; Sep. 1997—Apr. 2000; 116 pages; Agilent Technologies.

M. Castro, R. Sebastian, F. Yeves, J. Peire, J. Urrutia and J. Quesada; "Well-Known Serial Buses for Distributed Control of Backup Power Plants. RS-485 versus Controller Area Network (CAN) Solutions"; IEEE 28th Annual Conference of the Industrial Electronics Society (IECON 02); Nov. 2002; pp. 2381-2386; vol. 3.

"Six-Channel Power Supply Supervisor and Cascade Sequence Controller" (Preliminary Information Data Sheet); SUMMIT Microelectronics, Inc.; www.summitmicro.com/prod_select/summary/sms66/SMS66DS.pdf; 2003; 26 pages.

"Operating Manual for Internal RS-232 Interface for XT 60 Watt and HPC 300 Watt Series Programmable DC Power Supplies"; 2002; 62 pages; Xantrex Technology Inc.; Burnaby, B.C., Canada.

Paul Birman and Sarkis Nercessian; "Programmable supplies use switch-mode topologies"; Mar. 1995; pp. 33-34; Electronic Products Magazine; Garden City, New York, U.S.A.

A. Akiyama, T. Nakamura, M. Yoshida, T. Kubo, N. Yamamoto and T. Katoh; "KEKB Power Supply Interface Controller Module"; KEK, High Energy Accelerator Research Organization; 4 pages; Japan.

T. T. Nakaura, A. Akiyama, T. Katoh, Ta. Kubo, N. Yamamoto, and M. Yoshida; "Magnet Power Supply Control System in KEKB Accelerators"; International Conference on Accelerator and Large Experimental Physics Control Systems; 1999; pp. 406-408; Trieste, Italy.

"Installation Guide—Agilent Technologies MPS Mainframe Model 66000A"; Apr. 2000; 29 pages; Agilent Technologies; Malaysia.

"Chemistry-Independent Battery Chargers"; Maxim Integrated Products; http://pdfserv.maxim-ic.com/en/ds/MAX1647-MAX1648.pdf; 25 pages; Sunnyvale, CA, U.S.A.

Ron Vinsant, John DiFiore and Richard Clarke; "Digitally-controlled SMPS extends power system capabilities"; Powerconversion & Intelligent Motion; 1994; pp. 30-37; vol. 20, No. 6.

"Calibrate," The Merriman-Webster Dictionary, copyright 2007-2008, Merriam-Webster, Inc., 11th Edition, 4 pages.
Office Action of Aug. 20, 2008, in U.S. Appl. No. 11/425,489, 37 pages.
Office Action of Aug. 19, 2008, in U.S. Appl. No. 11/435,629, 31 pages.
Office Action of Sep. 20, 2006, in U.S. Appl. No. 10/820,976, 19 pages.
Office Action of Feb. 21, 2007, in U.S. Appl. No. 10/820,976, 12 pages.
Final Office Action of Aug. 14, 2007, in U.S. Appl. No. 10/820,976, 12 pages.
Advisory Action of Oct. 26, 2007, in U.S. Appl. No. 10/820,976, 3 pages.
Examiner's Answer of Mar. 18, 2008, in U.S. Appl. No. 10/820,976, 18 pages.
Office Action of Jun. 17, 2008, in U.S. Appl. No. 10/820,976, 13 pages.
Office Action of Mar. 6, 2008, in U.S. Appl. No. 11/356,674, 39 pages.
Office Action of Nov. 8, 2006, in U.S. Appl. No. 11/198,698, 41 pages.
Final Office Action of May 3, 2007, in U.S. Appl. No. 11/198,698, 36 pages.
Interview Summary of May 31, 2007, in U.S. Appl. No. 11/198,698, 4 pages.
Office Action of Jul. 25, 2007, in U.S. Appl. No. 11/198,698, 32 pages.
Interview Summary of Oct. 31, 2007, in U.S. Appl. No. 11/198,698, 3 pages.
Final Office Action of Dec. 27, 2007, in U.S. Appl. No. 11/198,698, 30 pages.
Advisory Action of Feb. 19, 2008, in U.S. Appl. No. 11/198,698, 3 pages.
Interview Summary of Jul. 14, 2008, in U.S. Appl. No. 11/198,698, 2 pages.
Office Action of Nov. 13, 2006, in U.S. Appl. No. 11/405,294, 35 pages.
Final Office Action of May 8, 2007, in U.S. Appl. No. 11/405,294, 37 pages.
Office Action of Jul. 25, 2007, in U.S. Appl. No. 11/405,294, 35 pages.
Final Office Action of Dec. 27, 2007, in U.S. Appl. No. 11/405,294, 32 pages.
Advisory Action of Feb. 19, 2008, in U.S. Appl. No. 11/405,294, 3 pages.
Office Action of Oct. 9, 2007, in U.S. Appl. No. 11/425,489, 35 pages.
Final Office Action of Apr. 4, 2008, in U.S. Appl. No. 11/425,489, 29 pages.

* cited by examiner

METHOD AND APPARATUS FOR IMPROVED DC POWER DELIVER, MANAGEMENT AND CONFIGURATION

PRIORITY CLAIM

This application is a continuation of application Ser. No. 10/820,976 filed on Apr. 8, 2004 now U.S. Pat. No. 7,506,179 titled "Method And Apparatus For Improved DC Power Delivery, Management And Configuration", whose inventor was James W. Templeton, which claims benefit of priority of provisional application Ser. No. 60/462,414 titled "Method And Apparatus For Improved DC Power Delivery, Management And Configuration" and filed Apr. 11, 2003, which are both hereby incorporated by reference as though fully and completely set forth herein.

BACKGROUND OF THE INVENTION

1. Field of the Invention

The present invention relates generally to power systems. More specifically, the present invention provides an improved method and apparatus for DC power delivery, management and configuration.

2. Description of the Related Art

From 1995 to 2001, the highest density processors from manufacturers such as Intel went from a power consumption rate of about 30 Watts at 3.3 V to a power consumption rate of about 90 Watts delivered at 1.5 V. A simple application of the power-voltage-current relationship reveals that the total current consumed by these chips has increased from nine amps to about 60 amps in a very short time period. There are similar analogies with all larger digital integrated circuits (ICs).

This rapid evolution has created new and significant problems in delivery of the power to and removal of waste heat from these ICs. Power supply design is now a much more critical and difficult task than it was a few years ago. High-current/low-voltage ICs require a very clean and stable source of DC power. The power source must be capable of delivering very fast current transients. The electronic path to these loads must also have low resistance and inductance (a 1.5V supply would be completely dropped across a 25 mΩ resistance at 60 Amps).

Traditionally, DC power supplies were designed to convert AC line voltage to one or more DC outputs that would be routed throughout a system to the points of load (POL). FIG. 1 is an illustration of a prior art power distribution system. As shown in FIG. 1, a power distribution scheme 100 may comprise an AC to DC converter 102 generating output voltages $V_1$, $V_2$, $V_3$, and $V_4$ that may be distributed to various POLs (point of loads). However, it may not be practical to route high-current signals throughout a system.

To overcome this difficulty, and to reduce the ill effects of distributing high current signals around a system, an alternative method of distributing power at modest voltage and current levels has been adopted. Rather than converting AC supply voltage level to the DC voltage level required by various loads at a central location, the AC supply voltage is typically converted to a "reasonable" DC voltage and routed to the "point of load" (POL), where it is converted locally to the required low voltage. This technique is referred to as "Distributed Power Architecture", or DPA, and is illustrated in FIG. 2. As shown in PDA system 200 of FIG. 2, an AC to DC voltage converter 202 may produce an intermediate DC voltage $V_x$, which may be routed to individual local DC to DC converters 204, 206, 208, and 210, which in turn may provide the required DC voltages $V_1$, $V_2$, $V_3$, and $V_4$, respectively, to their corresponding POLs. With a DPA, errors may be reduced since the distance traveled by a high-current signal is minimized, thus reducing I×R (resistive) and L di/dt (inductive) errors.

In many power distribution systems it is typically not enough to just distribute power around a system to the various POLs. Complex electronic systems are generally monitored and controlled to ensure maximum reliability and performance. Functions, or power supply features typically implemented in DPA systems are listed below.

Supply Sequencing

A modern electronic system can contain many ICs and each IC can have several supply voltage requirements. For example, core logic may require one voltage and the I/O may require a different voltage. This typically results in a need for setting the order in which the voltages on a single chip are applied and the order in which the chips in a system are powered up.

Hot Swap

Many electronic systems, including computers, telecom racks, storage devices and battery-operated devices require "hot swap" capability. Hot swap capability typically comprises the live attachment of a device to power, i.e., attaching a device to a system that is powered up (without having to power down the system prior to the attachment). Examples of hot swap events may include installing a battery in a PDA or plugging a USB device into a computer.

Ramp Control

It is sometimes necessary to control the rate at which the DC output voltage of a converter ramps from its initial value to its nominal value. This may be done in support of managing a hot-swap event, sequencing requirement or satisfying the requirements of the load.

Voltage Programming

The final voltage presented to a load may need to be programmed to the desired value or may need to be "trimmed" to a precise value. Some systems require active voltage programming of devices during their use in the systems.

Load Monitoring

In order to maintain high reliability of an electronic system, monitoring of load status is sometimes required. Both current and voltage may need to be monitored and action may need to be taken based on the load status measurements. Current and voltage may also need to be monitored for undershoot and overshoot conditions. In some systems, when an error is detected, the system may take corrective action by switching the load off, isolating the load or just setting a system flag.

Tracking

Many times it is desirable to have the output of one more converters follow, or mirror, the output of one or more other converters in the system. Tracking a specific voltage level, for example, may include setting the voltage level of a tracking converter or device to the voltage level of a tracked converter or device, and changing the voltage level of the tracking device to match the voltage level of the tracked device any time the voltage level of the tracked device changes. In some cases the voltage levels of tracking devices and tracked devices may not be the same; changes in the tracked voltage level would simply be mirrored in the voltage output of the tracking devices. For example, if the tracked voltage increases by 0.2V, the tracking voltage would also increase by 0.2V.

Temperature Monitoring

Dense electronic systems often generate excessive waste heat. The excessive heat generally needs to be removed in order to keep the electronics operating at their safe operating temperature. Therefore, the temperature of individual loads as well as the temperature of various locations within the system's enclosure is typically monitored. When temperatures reach unacceptable limits, action may need to be taken locally and/or at the system level. Such corrective actions often include turning on or speeding up fans, setting an alarm or simply shutting down the power to the problematic load. Temperatures can be measured using several methods. Some large digital processors sometimes incorporate embedded temperature sensor diodes on chip. Other systems may employ thermistors and IC temperature sensors.

Fan Speed Control

In conjunction with temperature monitoring it is often necessary to monitor and control fan speed. This may be done to control airflow or to control acoustic noise.

Phase Control

DC voltage is typically stepped down in one of two ways, linear regulation and DC-to-DC conversion. DC-to-DC converters may step down DC voltage by pulse width modulation (PWM) of an input voltage and passive filtering of the output. The duty cycle of the PWM signal generally approximates the ratio of output voltage to input voltage divided by the efficiency of the converter. For example, for an ideal DC-to-DC converter with a desired output of 1.2V and an input of 12V, the duty cycle would be 10%. In high current applications, it is often desirable to force the various DC-to-DC converters to sample different "phases" of their clock cycle. That is, to prevent DC-to-DC converters in a system from all sampling the first 10% of a clock cycle, one converter may sample the first 10% of the clock cycle and the next converter may sample a different 10% of the clock cycle, and so on. This typically reduces noise and improves transient response. This technique is also used in motor control and is often implemented to control multiple fans in a system. PWM controlled fans with staggered phase typically offer reduced acoustic noise.

Current Sharing

In addition to forcing DC-to-DC converters to sample staggered phases of the switching clock, it is sometimes desirable to force two or more independent converters to each deliver an equal share of the load current. This approach provides improved noise and transient response in high-current applications.

Programmable Switching Frequency

Certain DC-to-DC converters feature programmable switch frequencies. Frequencies may be selected based on several system concerns.

Synchronization of Switching Clocks

It is often desirable to synchronize the switching frequency of DC-to-DC converters in a system to each other or to some other system clock. This is typically performed to reduce the probability of mixing the clock or its harmonics with important system clocks. It is of particular interest in communication applications.

There are other functions that may be required for power systems. For example, single points of temperature measurement, open/closed status of doors and vibration may be of interest.

In order to accommodate a demand for more power and denser systems and the resulting new distribution problems, many present power distribution schemes began offering multiples of each solution, or functions, in a single package. Typically each of these functions requires a separate configuration within the system. That is, each function may require its own interconnection network tying POL converters together and implement glue-logic that may be required for control of the POL converters in order for the particular function to be successfully executed during system operation. Many of these functions comprise analog signal control requiring corresponding analog signal lines, with POL converters interconnected in point-to-point configurations. Routing of such signals is often difficult, while no true communication is established between various POL converters and/or between the POL converters and any other elements of the system.

In an effort to tie all or most of these functions together at the system level, one approach has been to implement the functions in control ICs responsible for controlling respective POL converters. Some of the functionality may also be programmed into a microcontroller that may communicate with attached POL converters over an I$^2$C (inter-IC communication) bus to coordinate control of all POL converters in the system. FIG. 3 illustrates an example of an I$^2$C-based system. As shown in FIG. 3, a microcontroller 302 may be coupled to POL converters 320, 322, 324, and 326, with the connections between the devices representing an I$^2$C bus. A configuration as shown in FIG. 3 is typically not suited for active control and is used mainly for status monitoring, where POL converters 320, 322, 324, and 326 may send a status signal back to microcontroller 302, which in turn may send a simple control signal to a respective POL converter based on the status information received from the respective POL converter. In general, microcontroller 302 checks status for one POL converter at a time, which may be viewed as a disadvantage when more interactive, real-time communication is desired in a system.

FIG. 4 illustrates one example of a single function implemented in a DPA system. Typically, a supply controller 350 (providing control for executing the function) and DC-to-DC voltage converters 352, 354, 356, and 358 are connected in a point-to-point configuration as shown. Supply controller 350 is coupled to each DC-to-DC converter over dedicated lines, (typically analog lines are used for implementing most functions), more specifically over lines 372 and 362 to converter 352, lines 374 and 364 to converter 354, lines 376 and 366 to converter 355, and lines 378 and 368 to converter 358. Input supply voltage $V_{IN}$ 360 is coupled to each DC-to-DC converter, and in turn DC-to-DC converter 352 may produce, for a respective POL or POLs, DC output voltage 370, DC-to-DC converter 354 may produce DC output voltage 372, DC-to-DC converter 356 may produce DC output voltage 374, and DC-to-DC converter 358 may produce DC output voltage 376. A power distribution scheme as shown in FIG. 3 and FIG. 4 generally features redundancies, and often requires complicated routing, especially in the case of analog interconnectivity as illustrated in FIG. 4.

Some analog converters available today already contain some of the functions, for example current share and/or tracking, but these functions are still unique to the converters, do not take into consideration system level requirements, and typically still require to be configured individually per function in the system.

In summary, current systems feature a variety of control chips, discrete devices, or glue logic that typically use an I$^2$C (or SMB) bus, and/or employ a microcontroller to control the converter devices and program the bus. This approach incorporates the traditional partitioning along analog and digital boundaries, and typically leads to redundancy and complicated routing requirements in a system. A new approach is needed using a system level mentality.

Many other problems and disadvantages of the prior art will become apparent to one skilled in the art after comparing such prior art with the present invention as described herein:

SUMMARY OF THE INVENTION

The present invention relates to a new way to control, configure, monitor and manage DC power distribution in modern electronic systems. Specifically, in one embodiment the present invention provides a new system-level approach to managing the delivery of DC voltage and/or current. Several system level functions may be enabled without requiring separate ICs to perform those functions. In one set of embodiments the system comprises several control chips and a novel way of enabling the control chips to communicate with each other. In one embodiment the system couples a group of control chips in a configuration that reduces the overall cost of implementing the common features required in advanced electronic systems. The system may be expandable and may include some inherent reliability features. One set of embodiments is particularly suited for use in rack-based electronics and computer servers; however, alternate embodiments may be equally applicable to smaller and portable electronics, automotive systems and motor control applications.

In one embodiment, supervisory functions for a voltage converter are performed by a central control module or chip that is coupled to the point-of-load (POL) voltage converters through a serial digital bus. The POL converters may also use the serial digital bus to provide real-time feedback information to the central control module or chip.

In another set of embodiments, the multiple supervisory functions for the POL voltage converters are combined in a single POL converter unit, also referred to as digital power management device that may include a DC-to-DC voltage converter. The system may then be enabled by establishing a communication path between the individual digital power management devices. A communication path may also be established from the digital power management devices to a common point, which may be a supervisory control unit coordinating higher level functions of the system. The communication path may be a digital bus and may also be a serial bus. In one set of embodiments, the digital power management devices are operable to exchange information, including status and feedback data, over the control and communication bus to coordinate their functions without requiring a supervisory control unit.

In one embodiment, single digital power management devices are combined together in a current sharing configuration in a "plug-and-play" fashion, where the control logic in each digital power management device is capable of automatically establishing control loops required for operating as a multi-phase supply. Feedback necessary for establishing control may be transmitted across the digital bus coupling the devices. The communication path may also be implemented by using a small amplitude RF signal superimposed onto a DC power bus.

BRIEF DESCRIPTION OF THE DRAWINGS

The foregoing, as well as other objects, features, and advantages of this invention may be more completely understood by reference to the following detailed description when read together with the accompanying drawings in which.

Figure 1:
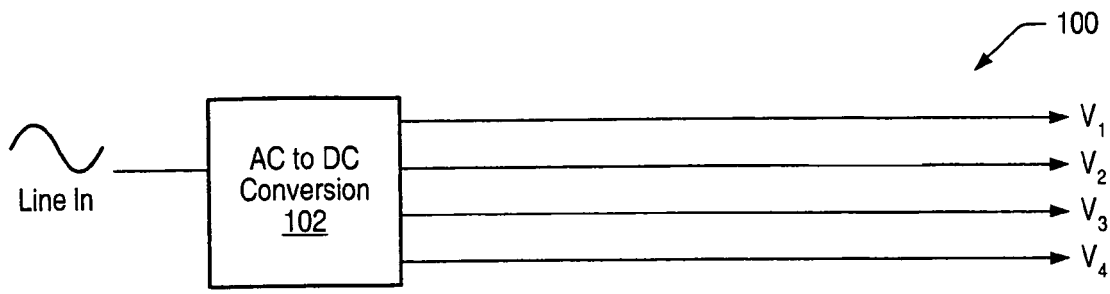
FIG. 1 illustrates a prior art power distribution circuit.
Figure 2:
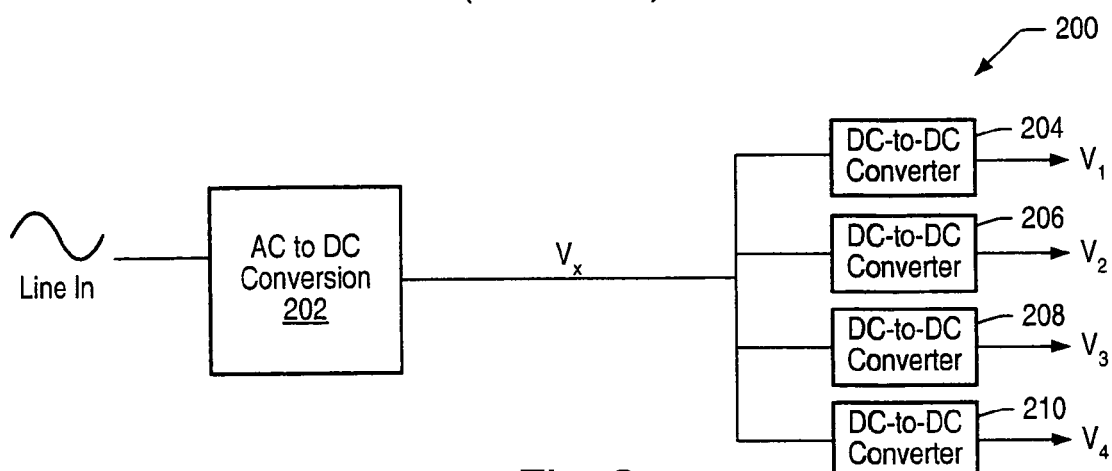
FIG. 2 illustrates a distributed power architecture (DPA) according to the prior art.
Figure 3:
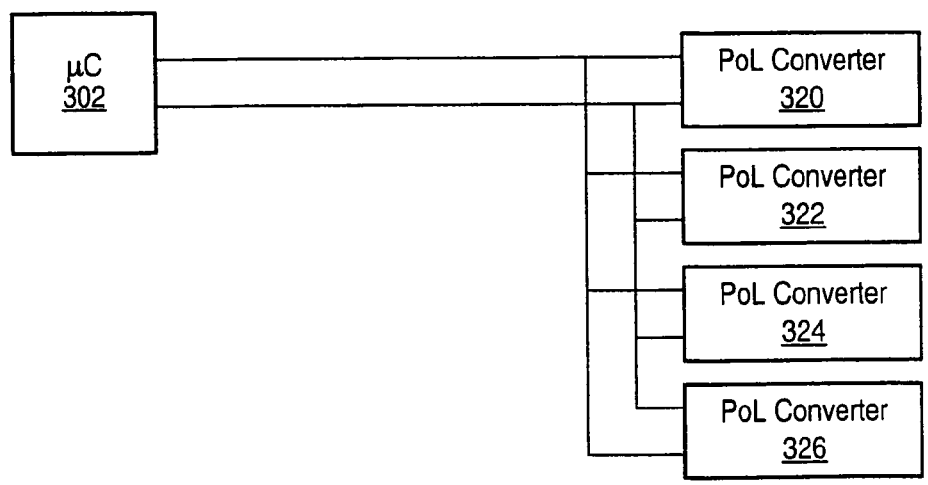
FIG. 3 illustrates a prior art system wherein a microcontroller communicates with POL converter devices over an I$^2$C bus.
Figure 4:
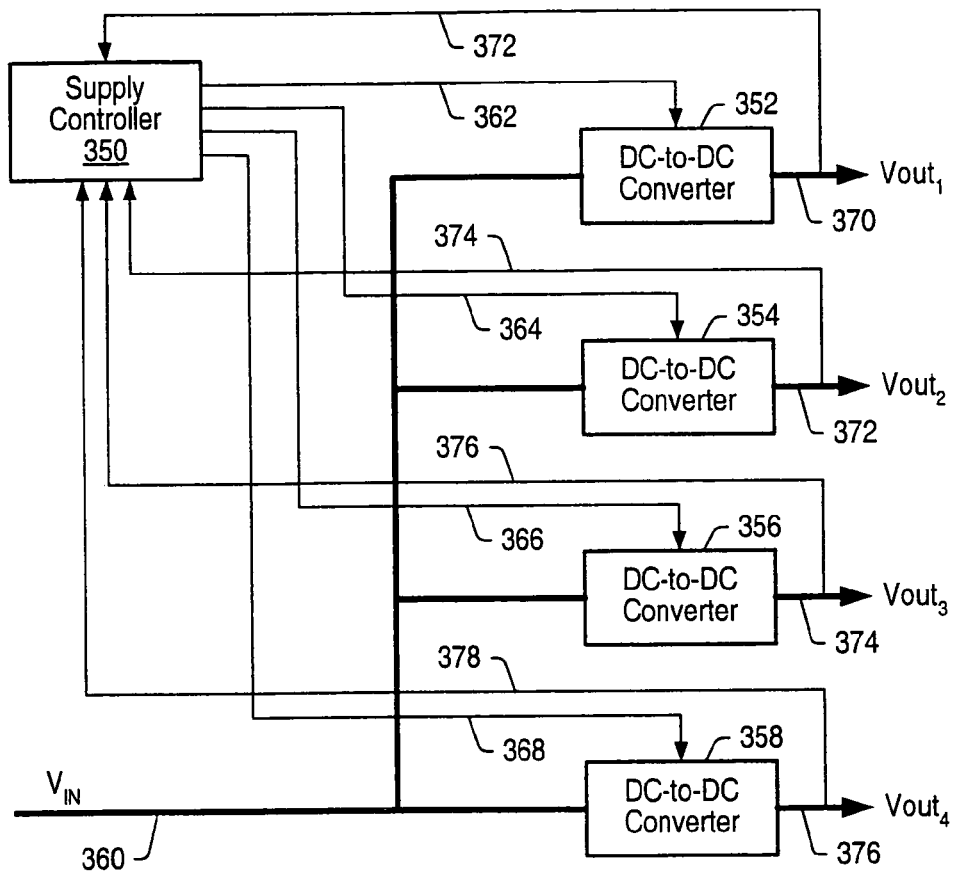
FIG. 4 illustrates a prior art system wherein DC-to-DC voltage converters are interconnected in a point-to-point configuration, controlled by a central supply controller to perform a specific function.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)."

DETAILED DESCRIPTION OF THE PREFERRED EMBODIMENTS

As used herein, a "trigger" signal is defined as a signal that is used to initiate, or "trigger", an event or a sequence of events in a digital system. A trigger signal is said to be in a "triggering state" at a time when it initiates a desired event, or sequence of events. A periodic trigger signal may commonly be referred to as a "clock". In a "synchronous" digital system, generally a clock, commonly referred to as a "system clock", may be used for initiating most events, or sequences of events. An example of a triggering state may be, but is not limited to, a rising edge of a pulse of a clock in a synchronous digital system. A "frequency" of pulses refers to a number of pulses that may appear within a selected unit period of time. For example, if twenty pulses appear within duration of one second, then the frequency of the pulses is 20 Hz.

When an event, or a sequence of events, is said to be initiated "in response to" receiving a stimulus signal, it may be implied that the event, or the sequence of events, is initiated as a result of a combination of a trigger signal, used in triggering the event or sequence of events, being in a triggering state at a time when the stimulus signal is asserted. In one set of embodiments, the sending of a pulse through an output port may indicate a point in time at which a leading edge of the pulse occurs at the output port, and the receiving of a pulse through an input port may indicate a point in time at which a leading edge of the pulse occurs at the input port. As used herein, "setting" a device refers to setting an output of the device to a high logic level, whereas "resetting" a device refers to setting an output of the device to a low logic level. It will be evident to those skilled in the art that a high logic level may be physically represented by either a high voltage or a low voltage, and similarly a low logic level may be physically represented by either a low voltage or a high voltage.

When referencing a pulse of a signal, a "leading edge" of the pulse is a first edge of the pulse, resulting from the value of the signal changing from a default value, and a "trailing edge" is a second edge of the pulse, resulting from the value of the signal returning to the default value. When data is said to be "registered" or "latched" "using" a signal, the signal acts as a trigger signal that controls the storing of the data into the register or latch. In other words, when a signal "used" for registering or latching data is in its triggering state, the data residing at respective input ports of the register or latch is stored into the register or latch. Similarly, when data is latched "on the leading edge" or "on the trailing edge" of a pulse of a clock, the data residing at respective input ports of a register or latch is stored into the register or latch, respectively, when a leading edge or a trailing edge of a pulse of the clock occurs, respectively. As used herein, the terms "POL converter" and "DC-to-DC converter" are used interchangeably, with the understanding that typically in DPA systems power is provided to POLs via DC-to-DC converters.

Figure 5:
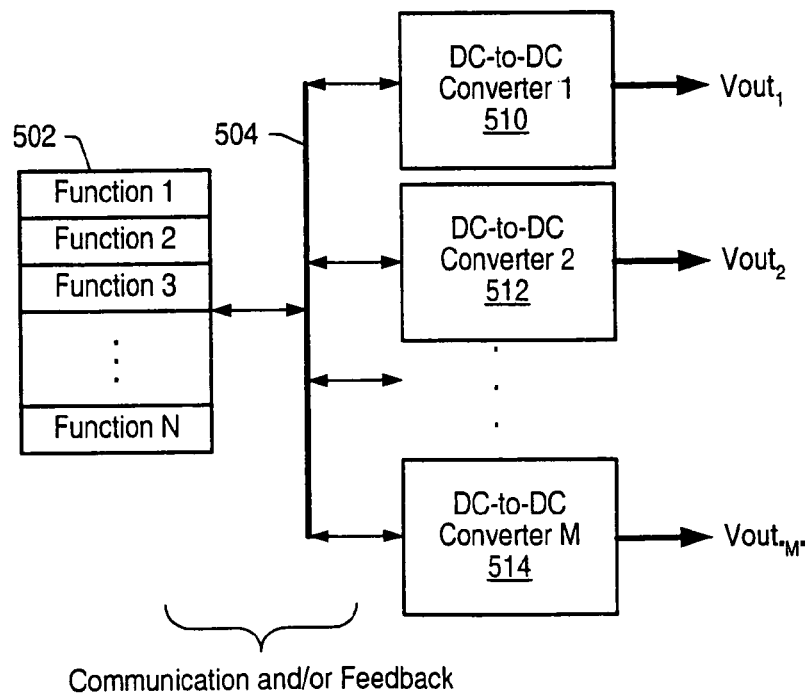
FIG. 5 illustrates an embodiment of the system of the present invention for improved DC power delivery, management and configuration.

Various embodiments of the present invention offer a new, system level approach to power distribution and management with all of the system level concerns taken into account as a whole rather than as separate issues. One embodiment of the present invention is illustrated in FIG. 5. As shown, the common functions required in a complex DC power system may be combined in a single controller rather than treated as separate IC functions. As shown in FIG. 5, a controller 502 managing functions 1 through N may be coupled to DC-to-DC converters 1 through M (illustrated by example as converters 510, 512 and 514) via a digital bus 504. Digital bus 504 may be a serial bus enabling communication with reduced wiring requirements. In the configuration shown in FIG. 5, real-time communication is made possible between converters 510, 512, and 514 and controller 502 by their being coupled to serial digital bus 504.

Figure 6:
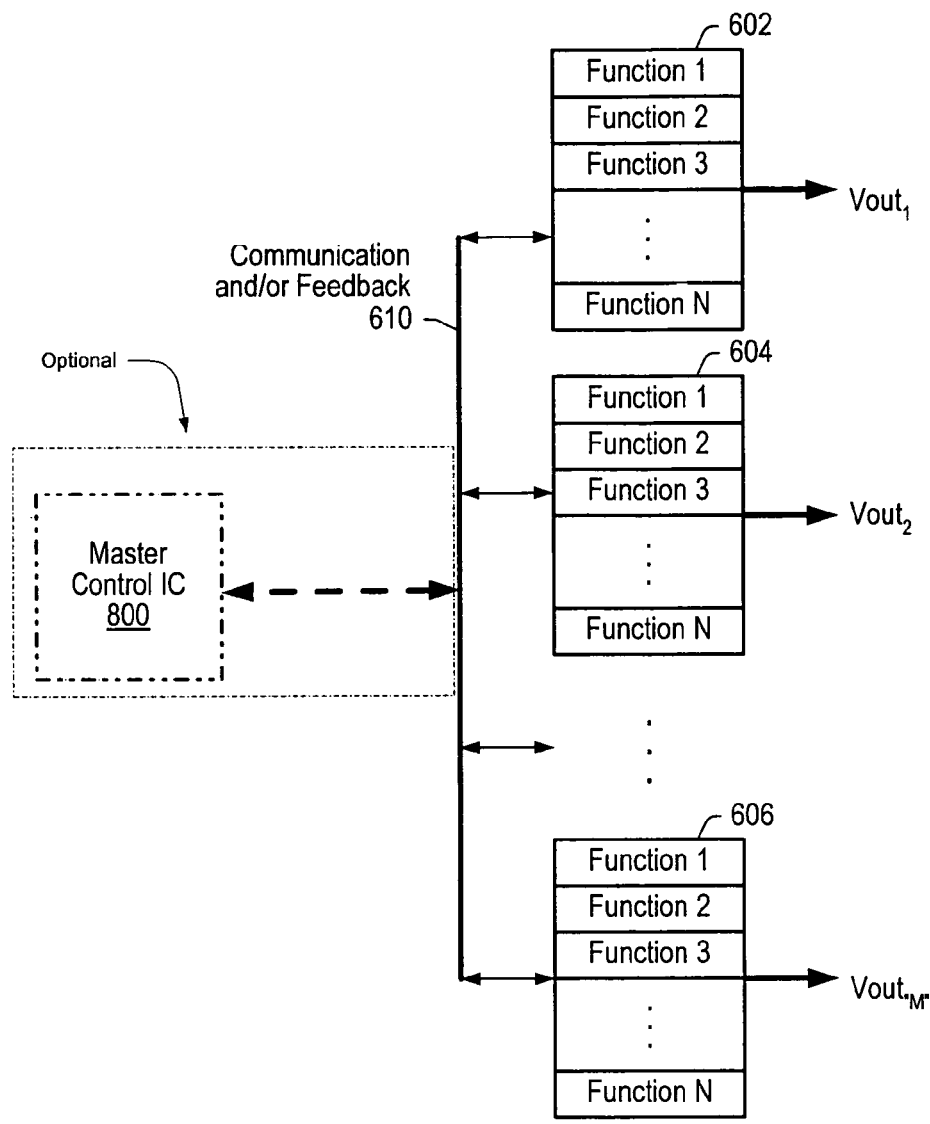
FIG. 6 illustrates the interconnection of digital power management devices (DPMDs) according to one embodiment of the present invention.

In one embodiment, the present invention provides a system-oriented solution using mixed-signal IC technology, allocating one unit of each function to a single point of load (POL) IC, or digital power management device (DPMD). In this embodiment, one DC-to-DC voltage converter, one unit of supply sequencing, one unit of load monitoring, and one respective unit of various other functions (previously discussed) are combined in a single DPMD, as illustrated in FIG. 6. This approach may be enabled by each DPMD having the ability to communicate with any other DPMD, and/or with an optional master control IC. As shown in the embodiment illustrated in FIG. 6, DPMDs 602, 604, and 606 have each been allocated Functions 1 through N, and are coupled together via serial digital bus 610. Bus 610 may be simpler than an I²C bus and may offer more control and signaling, including real-time data feedback capability. Bus 610 may also allow each DPMD to be coupled to a master control IC (MCIC) 800, or to be coupled directly to each other, enabling all system level functions to be configured, controlled and monitored providing simple and flexible results. While FIG. 6 shows an MCIC 800 coupled to bus 610, MCIC 800 is optional and alternate embodiments may omit MCIC 800 and only include DPMDs coupled to bus 610, and all required functions may be controlled by a single DPMD or a group of DPMDs operating together.

Embodiments of the present invention, as illustrated in FIG. 6, provide a modular approach to designing DPA systems, providing system level functionality without requiring the system to be individually and separately configured for each desired function that may be required. Each DPMD may be individually configured prior to its being placed in the system, and may operate to perform all necessary functions by having access to real-time feedback information over bus 610, and by communicating with other DPMDs. This represents active control as opposed to simple status monitoring.

The DPMD

Several devices may be enabled when the DPA system is configured as illustrated in FIG. 6. Rather than just consisting of a DC-to-DC converter, a DPMD may consist of a DC-to-DC converter and all of the associated control, configuration and monitoring functions associated with a single node.

Supply sequencing, phase control and other select functions in a system may be implemented in the context of multiple nodes as opposed to a single node, with each node aware of other nodes in the system. In one embodiment, the DPMD of the present invention has the ability to communicate at the system level so that features, such as supply sequencing, load sharing and phase control may be enabled. Bi-directional digital communication between a DPMD and another DPMD and/or between a DPMD and an optional master control IC may be accomplished in several ways. In one embodiment, functions that involve the interaction of two or more DPMDs are enabled and/or controlled by an "ad-hoc" network that is formed when the individual devices are coupled together, as shown in FIG. 6. In another embodiment, a dedicated control IC is also connected to the DPMDs to coordinate certain higher-level functions. It should be noted, again, that while embodiments of the present invention may be configured with a dedicated (master) controller or control IC, such master controllers are not required as each DPMD may be designed to contain all the required functionality for a given system.

A DPMD may function independently of any bus to which it may be coupled. That is, a DPMD may accept instructions from the bus to which it is coupled and may place status data onto the bus, while also being operable to function autonomously from the bus. Thus, the system may remain operational even in case of a bus failure. However, the individual nodes on the bus may use the bus to transmit real-time feedback data to other nodes or controllers on the bus, simplifying complex control problems.

Figure 7:
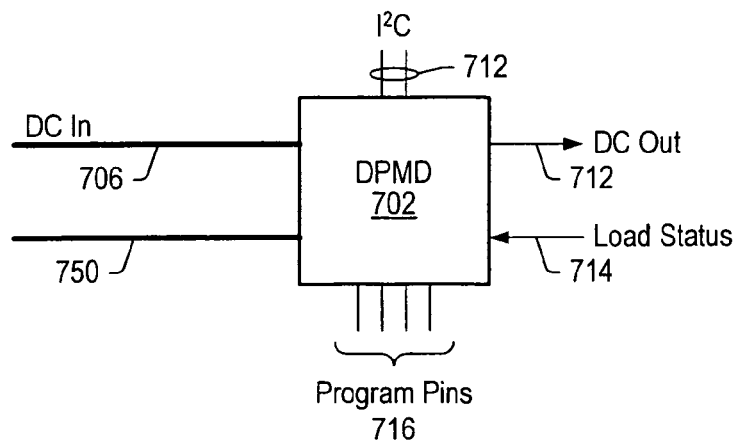
FIG. 7 illustrates a DPMD configured in accordance with one embodiment of the present invention.

Each DPMD may deliver information to and receive information from the load as illustrated in FIG. 7. As shown in the embodiment of FIG. 7, DPMD 702 may be configured through program pins 716. The DPMD's output current and/or voltage may also be remotely programmable to affect DC output 712. In addition, the DPMD may also measure the current, voltage and temperature of the load received through load status line 714 in real-time, and take independent action to effect a change such as lowering voltage, limiting current, turning off a device, etc. Information input to the DPMD may be digitized by the DPMD and made available to the other components via bus 750 to which DPMD 702 and other DPMDs or devices may also be coupled. DPMD 702 may also be incorporated into previous systems due to its ability to interface with I²C bus 712. In one set of embodiments, I²C bus 712 may be used to configure DPMD 702 in lieu of using program pins 716.

DPMD 702 may be configured through program pins 716 by pin strapping or dynamically during operation via bus 750. For example, parameters such as output voltage and current levels may be set via the bus or by pin-strap selection. Similarly, the DPMDs may be programmed to limit how much current they deliver to a load, or to accept inputs and make them available to the bus. This may enable the load status comprising for example current, temperature or RPM readings to be digitized by the DPMD and made available to coupled bus 750.

For example, one or more DPMDs performing a pulse-width-modulation (PWM) function (for DC-to-DC conversion, motor drives etc.) may be synchronized to a common clock or to a multiple (and sub-multiple) of a common clock via coupled bus 750. In one set of embodiments, a group of DPMDs coupled to bus 750 may together "self-designate" the clock signal of one of the group as the master clock, and all other DPMDs of the group may be synchronized to the master clock since a sync pulse may be delivered over bus 750 and received by each DPMD. In alternate embodiments the DPMDs may be synchronized to a common clock by a master control IC that may also make the clock data and/or sync pulse available on bus 750. Additionally, the master control IC and DPMDs may incorporate the ability to synchronize their switching clocks to a special multiple (or prime number multiple) of a reference clock in order to reduce the probability of the switching clock mixing with or interfering with another system clock. One embodiment of a master control IC according to the present invention will be described in more detail below.

Control and Communication Bus

In order to reduce cost and complexity, a simple communication vehicle may be required. As shown in FIG. 7, each DPMD may be able to communicate using a proprietary communication protocol over bus 750, which may be a proprietary bus design, while also supporting configuration of DPMD 702 via an I²C bus 712.

Figure 8:
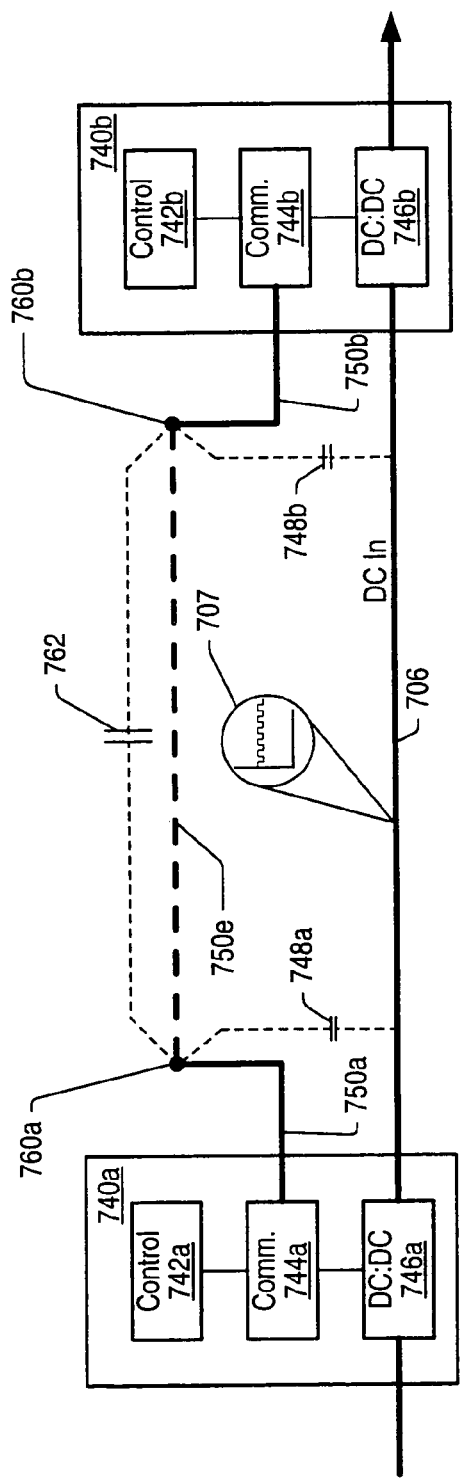
FIG. 8 illustrates three possible embodiments of a bus configuration.

The proprietary bus may be realized in different ways. In one embodiment, each DPMD has the ability to communicate over a serial transmission line formed by either a dedicated trace on a PC board or by using the power distribution bus as the transmission line. In this embodiment, system level features may be enabled through each component of the system communicating with other system elements over a common bus. As also previously mentioned, a dedicated control IC or a microcontroller coupled to the bus may also have the ability to report system status to other areas of a system. Furthermore, the data from individual loads and control of the individual loads, sensors, fans etc. may be made available to the World-Wide-Web (WWW) due to the availability of the data on the bus. FIG. 8 illustrates three possible embodiments of a control and communication bus established as a means of communication between DPMDs.

A simple trace on a PC board typically has near zero resistance at DC. However, at high frequency a PC trace on the PC board may form a transmission line with a ground plane. This "parasitic" transmission line may be used to transmit bus information for a system. In one embodiment of the present invention, the same bus that distributes the interim DC voltage 706 to all DPMDs may be used for the communication bus. This may remove special considerations for routing the bus signals. It may also ensure that a bus connection is nearby almost anywhere in the system. In order to communicate on a dedicated trace or the DC power bus, an inexpensive and low power method may be required. In one embodiment, a capacitive coupling is used to "inject" the communication signal onto the bus. A digital RF signal of small amplitude 707 may be used as the communication signal, "injected" onto DC power line 706. Signal 707 (on the order of 10's of mV) may be generated and terminated using a special communication circuit on DMPDs 740a and 740b that are communicating with each other, and may be made available on bus terminals 750a and 750b, respectively. Signal 707 may be capacitively coupled onto power bus 706 with inexpensive external capacitors or using on-chip capacitors, shown as capacitor 748a coupled to DC line 706 at node 760a and capacitor 748b coupled to DC line 706 at node 760b. This may provide inexpensive, low-power signal coupling, as well as galvanic isolation, which may be of concern in certain applications. In addition, the isolation may be exploited to provide further isolation for signals that need to cross the isolation barrier associated with the AC-to-DC conversion process in a power supply. It may also be important in medical applications where isolation from the human body is desired.

In alternate embodiments, bus terminals 750a and 750b are coupled together via connecting line 750e to form independent serial digital bus 750 featuring bus commands customized to enable efficient communication between DPMDs and between DMPDs and other devices that may be connected to the bus, for example a master control IC. In these embodiments none of the capacitors illustrated in FIG. 8 are used, and DC line 706 is not used to carry digital RF signals. In yet other embodiments, bus terminals 750a and 750b are capacitively coupled through capacitor 762 as shown, while capacitors 748a and 748b are removed from the system. As also shown in FIG. 8, DPMD 740a may include control logic 742a, communication logic 744a and a DC-to-DC converter 746a. Similarly, DPMD 740b may include control logic 742b, communication logic 744b and a DC-to-DC converter 746b.

Data on the bus may be of relatively low bandwidth, on the order of Kbps. The carrier frequency may be chosen to be high enough to enable generation of a small amplitude signal without dissipating much power, and low enough to allow signal 707 to travel forty or more inches on a typical PC board passing through two connectors. In one set of embodiments the frequency may be in the range of 80 to 100 MHz.

Master Control IC

In one set of embodiments a master control IC (MCIC) may be used to manage some of the control, monitoring, programming and configuration system tasks that are common to all DPMDs, minimizing die area for a given system due to a reduction in redundancy. The MCIC may receive inputs from other digital chips within the system and may also provide data to other system chips. Thus, power control, configuration, and monitoring may be made available to the entire system and any network to which the system may be connected, for example the World Wide Web (WWW).

Figure 9:
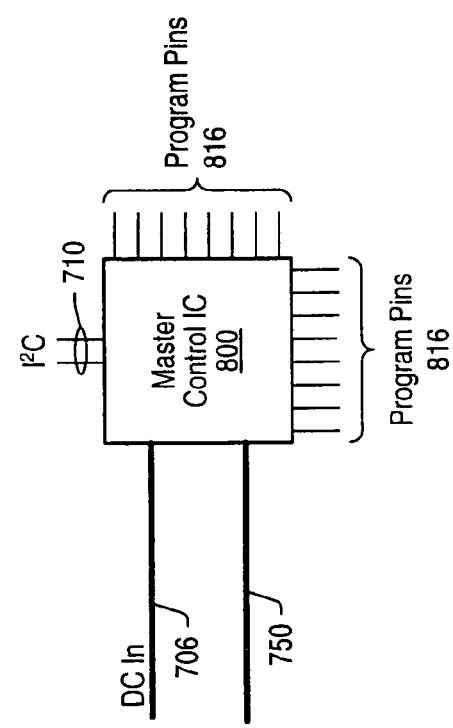
FIG. 9 illustrates a master control integrated circuit (MCIC) configured in accordance with one embodiment of the present invention.

One embodiment of a configuration of the MCIC is illustrated in FIG. 9. MCIC 800 may interface to I²C bus 710, and may couple to a serial digital bus 750, enabling the incorporation of legacy ICs in a system designed in accordance with principles of the present invention. MCIC 800 may be "programmed" or configured via pin-strapping using program pins 816 or through I²C bus 710. MCIC 800 may replace microcontrollers used in prior art systems. It may control DPMDs in the system over bus 750, over coupling small signal to power line 706, or via an embedded I²C controller. However, rather than requiring micro code for programming I²C bus 710 and the commands, MCIC 800 may perform dedicated "routines" that may issue common commands to the coupled DPMDs. A truth table may be devised to allow a user to configure common functions without having to write software routines. MCIC 800 may also be configured during manufacturing by connecting a computer to I²C bus port 710 and using custom software to set up the system.

In one embodiment, a controller comprised in MCIC 800 contains state machines capable of performing common functions like programming DPMDs, reading system status, and setting up system level functionality (such as supply sequencing and phase control). As the controller may be designed to work with the DPMDs, most features may be automatically enabled (or suppressed) by simple pin-strap choices. MCIC 800 may also contain system supervisory functions not associated with a particular DPMD. A number of MCICs may also be linked together in a master-slave or multi-master configuration such that a complex hierarchy may be established.

Thermal Considerations:

A major concern in electronics is the removal of waste heat. In many cases, this may be the limiting factor in the packing density of electronic devices. The most common method to remove heat from electronics is typically forced air-cooling from fans and impellors. Control of fans is usually established by measuring temperature at various locations in a system, and turning on the fan when the temperature reaches some pre-set threshold. Rack based systems may often rely on a series of fans and sensors to manage the thermal environment.

Figure 10:
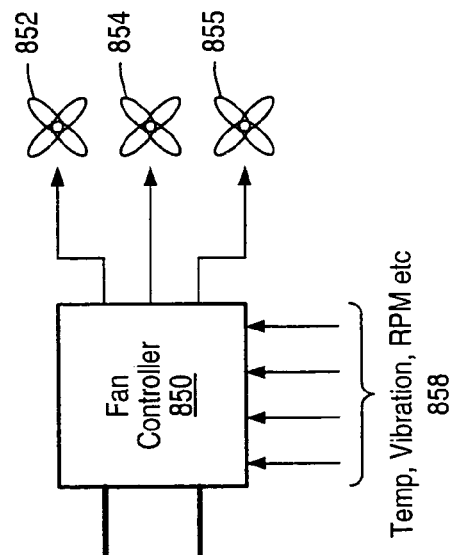
FIG. 10 illustrates a DPMD configured as a dedicated fan control integrated circuit in one embodiment of the present invention.

As an example of the versatility of DPMDs, FIG. 10 illustrates one embodiment of the present invention with a DPMD configured as a dedicated fan controller 850. In this embodiment, fan controller 850 is able to receive configuration commands either through bus 750, or through pin strapping. Parameters like temperature set point and hysteresis may be set by an MCIC, such as the one illustrated in FIG. 9. Through input lines 858, fan controller 850 may accept the input from one or more temperature sensors, rpm input from fans, vibration information, and other real-time feedback information, and may control the speed of fans 852, 854, and 855 in response. Fan controller 850 may be used to control more or less than the three fans shown in FIG. 10. Fans may be controlled using a pulse-width-modulated (PWM) scheme. Fan controllers may also operate to force several fans in a system to operate at different phases of the switching clock, reducing noise on the DC bus and reducing acoustic noise as well. One or more fan controllers may keep track of the current drawn from a particular fan, and may track received data in order to predict a fan failure before it happens. The data gathered by fan controller 850 through input lines 858 may be used on chip or made available digitally to bus 750.

Looking back now at the functions that may need to be controlled for a DC-to-DC converter, the following features are either improved or enabled by using DPMDs interconnected by a serial digital bus, as shown for example in FIG. 6, without a need for individually configuring the system for each function, or without requiring a central controller.

Supply Sequencing

Supply sequencing may be performed by DPMDs communicating with each other over a serial digital bus, sending and receiving real-time information over the bus, the DPMDs in effect "sequencing themselves". Alternately, the supply sequencing may also be performed by an MCIC communicating with the DPMDs across the bus. There is no need for a separate IC to control supply sequencing. The DPMDs and/or MCIC may be programmed via pin strapping or through the I²C bus.

Phase Staggering

The MCIC may have the ability to count the number of DPMDs on the bus and stagger them evenly in phase across the switching clock's period. Alternately, DPMDs coupled together via the bus may establish one DPMD as master that has the ability to perform the staggering operation, not requiring an MCIC. Either configuration may eliminate the need for separate phase control ICs and/or circuits. An exact number of phases may be supported, eliminating a need for fixed phase number controllers that are daisy-chained together. For example, a user wishing to control six phases may no longer be required to select two quad controllers.

Current Sharing

Current sharing may be supported between two or more DPMDs. The required feedback may be supported through the serial digital bus. In one embodiment, in lieu of using the MCIC to manage phase sharing across the bus, multiple DPMDs that will need to share current are directly coupled to each other. In this embodiment, the DPMDs that are coupled together in the sharing configuration also contain the circuitry necessary for managing the sharing function. When two DPMDs with current sharing circuitry built in are connected together, they may automatically share the load current to a common load.

Margining

In applications where high reliability is a concern, it may be important to have the capability to over-stress the components in a system during life testing of that system. Embodiments of the present invention include support for full digital programming over the bus that couples DPMDs together. This may enable a system designer to efficiently and quickly force the system to operate above or below maximum or minimum specifications for the test periods.

Hot Swap

Hot swap is typically used once per board and has been facilitated through various means in the past. For example, simple RC networks might have been used to delay one signal in relation to another, or mechanical ways might have been employed to delay supplies on a plug-in board (short fingers). In systems with a critical need to control how multiple ICs get powered up or down, hot swap ICs were usually employed. In one embodiment of the present invention the bus controller for the bus coupling the DPMDs includes a hot swap function incorporated on chip. This may eliminate the need for separate hot swap ICs.

Self Test

DPMDs may contain self-test capabilities and may configure themselves to perform self-testing when coupled together over the serial digital bus. Alternately, when an MCIC is used, the MCIC may be configured such that it polls all devices connected to the bus to perform a self-test. The MCIC, if one is used, may be configured to perform this operation during manufacturing test, upon system start-up or at any time by issuing a command to the bus controller.

Status Monitoring

The use of a serial digital bus enables real-time bi-directional data transfer. The DPMDs may interrupt all communication if there is a failure to report. The MCIC, when configured in a system and coupled to the bus to interface with the interconnected DPMDs, may take action upon receiving an interrupt from a DPMD.

Digital Feedback

The communication between DPMDs may comprise digital feedback, which may be substantially more robust than analog feedback. Any DPMD, or other device on the bus may pass feedback data to any other DPMD or device on the bus. This may allow DPMDs and/or other devices on the bus to form a closed loop control system, providing one venue through which current sharing and phase control may be implemented, for example.

Digital Programming

Each individual DPMD attached to the digital bus may be assigned a unique address by the MCIC. Addresses may also be manually assigned to the DPMDs via pin strapping by the user. Those skilled in the art will appreciate that addressing may also be performed through other means, and is not restricted to the two aforementioned methods. Once nodes have been assigned a unique address, they may be programmed remotely via the digital bus. Programming may be accomplished by placing a node in a program state, and issuing commands digitally over the communication bus (in this case either I²C or the digital bus). Output parameters and control functions may be programmed in this fashion. Information about the node or its load may also be read back from the node via the digital communication bus. In one embodiment, each DPMD (or node) has the ability to "lock out" program commands, that is, to reject commands from the bus. This feature may be useful in ensuring high levels of reliability.

Expandability

Each MCIC manufactured (or emulated using an FPGA) may be designed to manage a finite number of loads or inputs (sensors, etc.), recognize when a new node is added to the bus, and to support features to manage the new status of the system. Features like supply sequencing and current sharing may be manually configured or automatically configured depending on the needs of the user.

Implementing Current Sharing Using DPMDs and the Digital Bus

Figure 11:
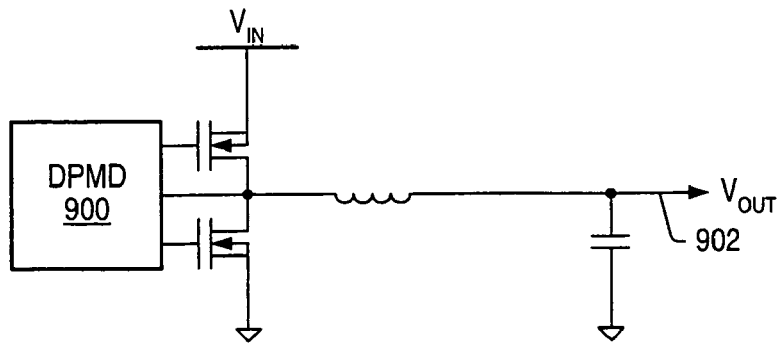
FIG. 11 illustrates a single-phase supply configured with a single DPMD in accordance with one embodiment of the present invention.
Figure 12:
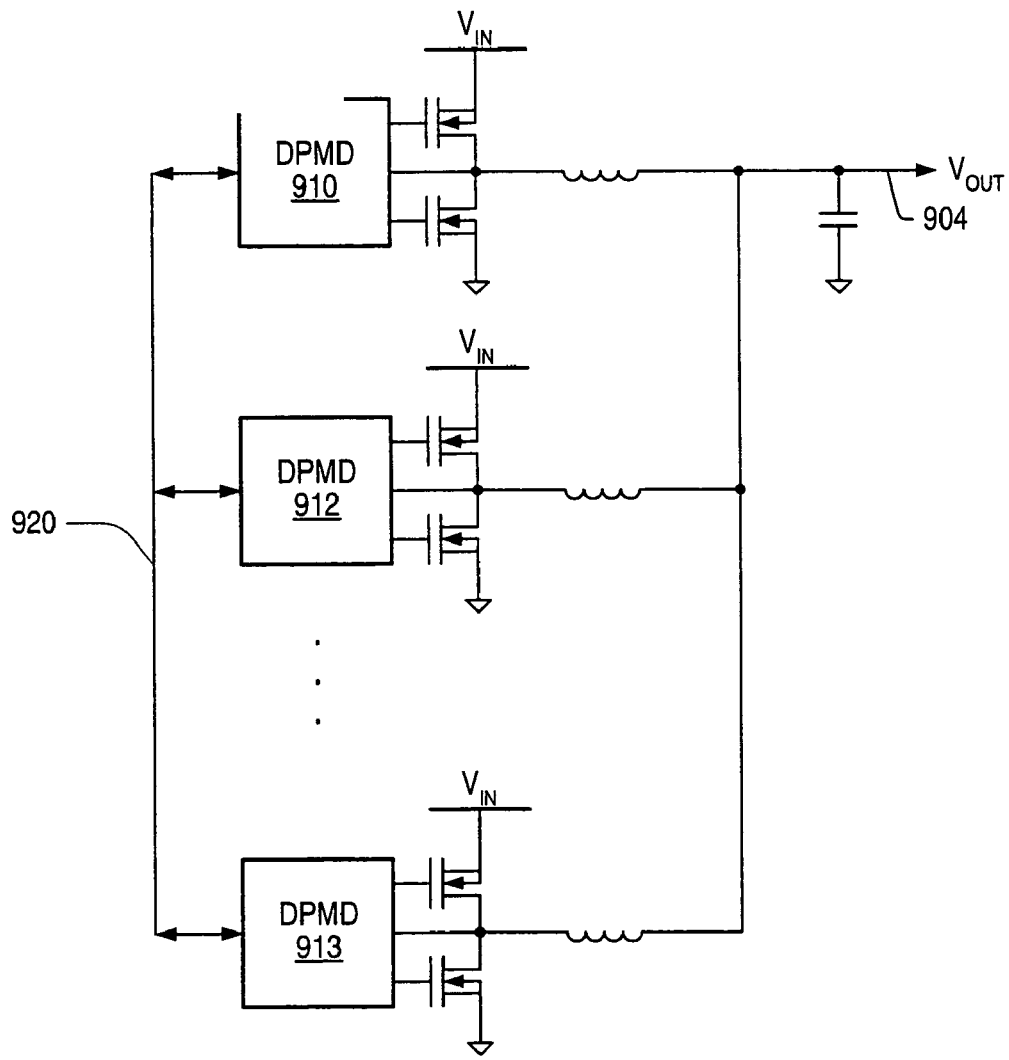
FIG. 12 illustrates a multi-phase supply configured with multiple DPMDs in accordance with one embodiment of the present invention.

Using the bus to implement a control loop between two or more DPMDs, the DPMDs may be configured to deliver current to a common load such that they each deliver an equal (or some other ratio) amount of the total load current. FIG. 11 shows a DPMD 900 in a single supply configuration, generating single output voltage 902. FIG. 12 illustrates one embodiment where multiple DPMDs are coupled together to form a multi-phase supply configuration. As shown in FIG. 12, DPMDs 910, 912, and 913 may be coupled to control and communication bus 920, while the respective outputs of DPMD 910, 912, and 913 may be coupled together to form a final output voltage 904. In one embodiment, each DPMD is configured with control logic that enables each DPMD to automatically establish the control loop(s) required for the multi-phase supply. Feedback required for establishing the control may be transmitted over serial digital control and communication bus 920. To create a multi-phase power supply, multiple DPMDs may simply be coupled together, for example in a configuration as shown in FIG. 12, approaching true plug-and-play simplicity. While the embodiment in FIG. 12 only shows three DPMDs coupled together, those skilled in the art will appreciate that a multi-phase supply configuration will not be limited to the number of DPMDs shown and more (or less) DPMDs may be used.

As disclosed herein, power delivery systems implemented in accordance with principles of the present invention will offer new levels of reliability. All bus-enabled ICs may enable continuous operation in the event the bus becomes disabled. In configurations where the bus may be used to pass real-time feedback, such as a current sharing configuration, the system may keep operating even when it no longer receives data from the bus. This also provides increased time to respond to failure, whereas in present analog systems signals typically rise or fall to a rail value in event of a failure.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

I claim:

1. A power delivery management system, the system comprising:
a plurality of point of load (POL) regulators, wherein each of the plurality of POL regulators is configured to perform one or more power management functions and to provide a regulated output voltage; and
a bidirectional serial data bus coupled to each one of the plurality of POL regulators;
wherein each one of the plurality of POL regulators is configured to receive power management function commands and monitoring information over the bidirectional serial data bus from other ones of the plurality of POL regulators to coordinate the one or more power management functions by performing one or more of the one or more power management functions according to the power management function commands and monitoring information transmitted onto the bidirectional serial data bus by the other ones of the plurality of POL regulators;
wherein the monitoring information comprises information indicative of a status of at least one power management function of at least one of the other ones of the plurality of POL regulators;
wherein each one of the plurality of POL regulators is configured to transmit/receive power management function commands to/from other ones of the plurality of POL regulators to adjust their power outputs.

2. The system of claim 1, wherein at least one of the plurality of POL regulators is configured to provide a clock signal and a synchronization signal onto the bidirectional serial data bus, wherein other ones of the plurality of POL regulators are configured to synchronize to the clock signal and operate according to the clock signal being a master clock signal.

3. The system of claim 1, further comprising a master controller coupled to the bidirectional serial data bus.

4. The system of claim 3, wherein the master controller is configured to provide a clock signal and a synchronization signal onto the bidirectional serial data bus, wherein the plurality of POL regulators are configured to synchronize to the clock signal and operate according to the clock signal being a master clock signal.

5. The system of claim 1, wherein at least one of the plurality of POL regulators comprises control and communication logic, and a DC-to-DC converter.

6. The system of claim 5, wherein the control and communication logic is configured to store output voltage parameter data, output current parameter data, and fault prediction data.

7. The system of claim 1, wherein each of the plurality of POL regulators is configured to function autonomously from the bidirectional data bus.

8. The system of claim 7, wherein the system is configured to remain operational even during a failure of the bidirectional data bus.

9. The system of claim 1, wherein at least one of the plurality of POL regulators is configured to receive, via the bidirectional serial data bus, real-time feedback data from respective load devices coupled to other ones of the plurality of POL regulators.

10. The system of claim 1, wherein at least one of the plurality of POL regulators is configured to transmit to the bidirectional serial data bus real-time feedback data corresponding to a respective load device coupled to the at least one POL regulator.

11. The system of claim 1, wherein the one or more power management functions comprise:
supply sequencing;
phase staggering;
current sharing;
margining;
lowering the regulated output voltage;
limiting an output current developed in response to the regulated output voltage; and
turning off a load device coupled to one of the plurality of POL regulators.

12. The system of claim 1, wherein at least one of the plurality of POL regulators is configured as a dedicated fan controller, wherein the at least one of the plurality of POL regulators is configured to store at least one of a temperature set point and hysteresis data.

13. A point of load (POL) regulator comprising communication logic configured to interface to a bidirectional serial data bus, wherein the POL regulator is configured to initiate communication with one or more other similar POL regulators via the communication logic over the bidirectional serial data bus to transmit and/or receive monitoring information and power management function commands to and/or from the one or more other similar POL regulators via the communication logic, to control operation of the POL regulator;
wherein the POL regulator and the other similar POL regulators together form a group of POL regulators, and wherein the monitoring information comprises information indicative of a status of at least one power management function of a POL regulator of the group of POL regulators transmitting the monitoring and/or control information onto the bidirectional serial data bus;
wherein the POL regulator is configured to transmit/receive power management function commands to/from other ones of the one or more other similar POL regulators to adjust power outputs of respective ones of the POL regulators.

14. The POL regulator of claim 13, wherein the POL regulator is configured to transmit an information packet onto the bidirectional serial data bus, wherein the information packet includes one or more of the following types of information: address, power management function command information, data.

15. The POL regulator of claim 14, wherein the address information comprises address information identifying one or more of the other similar POL regulators.

16. The POL regulator of claim 14, wherein the address information comprises address information identifying the POL regulator.

17. The POL regulator of claim 14, wherein the data comprises one or more of:
initial configuration data; and
data corresponding to the power management function command information.

18. The POL regulator of claim 14, wherein the bower management function command information corresponds to a power management function to be performed by at least one of the other similar POL regulators.

19. The POL regulator of claim 13, further comprising:
control logic configured to store output voltage parameter data, output current parameter data, and fault prediction data.

20. The POL regulator of claim 19, wherein the control logic is configured to perform one or more power management functions.

21. The POL regulator of claim 19, wherein the control logic and the communication logic are configured to operate together to perform one or more power management functions.

22. The POL regulator of claim 13, wherein the POL regulator is configured to provide a regulated output voltage to power one or more load devices coupled to the POL regulator.

23. The POL regulator of claim 13, wherein the POL regulator is configured to transmit a clock signal to the bidirectional serial data bus and to transmit a synchronization pulse to the one or more other similar POL regulators via the bidirectional serial data bus, wherein the synchronization pulse is used by the one or more other similar POL regulators to synchronize to the clock signal.

24. The POL regulator of claim 13 configured as a dedicated fan controller.

25. The POL regulator of claim 24, further comprising control logic configured to store temperature set point data and hysteresis data.

26. The POL regulator of claim 13 configured to send/receive real-time information over the bidirectional serial data bus to/from the one or more other similar POL regulators, wherein the POL regulator and the one or more other similar POL regulators are configured to sequence themselves according to the real-time information.

27. The POL regulator of claim 13, further comprising current sharing circuitry coupled to the communication logic, enabling the POL regulator to share, together with select ones of the one or more other similar POL regulators, a load current to a common load.

28. The POL regulator of claim 13, wherein the communication logic comprises hot swap functionality.

29. A power delivery management system, the system comprising:
a plurality of point of load (POL) regulators configured to perform one or more power management functions, wherein each of the plurality of POL regulators is configured to provide a regulated output voltage; and
a bidirectional serial data bus coupled to each one of the plurality of POL regulators;
wherein at least one POL regulator of the plurality of POL regulators is configured to communicate information over the bidirectional serial data bus to other ones of the plurality of POL regulators, wherein the communicated information is usable by the other ones of the plurality of POL regulators to affect how the other ones of the plurality of POL regulators perform the one or more power management functions;
wherein the information communicated over the bidirectional serial data bus by the at least one POL regulator comprises information indicative of a status of at least one power management function of the at least one POL regulator;
wherein each one of the plurality of POL regulators is configured to transmit/receive power management function commands to/from other ones of the plurality of POL regulators to adjust their power outputs.

30. The system of claim 29, wherein the communicated information comprises control data and monitoring data.

* * * * *

UNITED STATES PATENT AND TRADEMARK OFFICE
CERTIFICATE OF CORRECTION

PATENT NO. : 7,730,332 B1  Page 1 of 1
APPLICATION NO. : 11/405293
DATED : June 1, 2010
INVENTOR(S) : James W. Templeton It is certified that error appears in the above-identified patent and that said Letters Patent is hereby corrected as shown below:

Item [54] and Column 1, Line 5 in the Title:

Delete "METHOD AND APPARATUS FOR IMPROVED DC POWER DELIVERY, MANAGEMENT, AND CONFIGURATION" and substitute -- PLUG-AND-PLAY POINT OF LOAD REGULATOR --.

Column 15
Line 60, please delete "The POL regulator of claim 14, wherein the bower" and substitute -- The POL regulator of claim 14, wherein the power --.

Signed and Sealed this

Thirteenth Day of July, 2010

David J. Kappos
*Director of the United States Patent and Trademark Office*